No. 12,294. REISSUED DEC. 13, 1904.

F. MASON.

AUTOMATICALLY ADJUSTABLE BRACELET OR BELT.

APPLICATION FILED NOV. 5, 1904.

Inventor

Frederick Mason.

Witnesses

Edwin L. Yewell

M. E. Ryan

By Luttrell & Luttrell his Attorneys

No. 12,294. Reissued December 13, 1904.

UNITED STATES PATENT OFFICE.

FREDERICK MASON, OF ATTLEBORO, MASSACHUSETTS, ASSIGNOR TO MASON, HOWARD & CO., A COPARTNERSHIP.

AUTOMATICALLY-ADJUSTABLE BRACELET OR BELT.

SPECIFICATION forming part of Reissued Letters Patent No. 12,294, dated December 13, 1904.

Original No. 728,741, dated May 19, 1903. Application for reissue filed November 5, 1904. Serial No. 231,598.

*To all whom it may concern:*

Be it known that I, FREDERICK MASON, a resident of Attleboro, in the county of Bristol and State of Massachusetts, have invented certain new and useful Improvements in Automatically-Adjustable Bracelets or Belts; and I do hereby declare that the following is a full, clear, and exact description thereof, reference being had to the accompanying drawings, and to the letters of reference marked thereon, which form a part of this specification.

This invention relates to the class of wearing-apparel known as ladies' "bracelets" or "belts," and has for its object to produce a bracelet, belt, or other similar article for ornamental wear that is handsome in appearance, flexible in its action, and will automatically hug or fit close to the wrist, neck, or waist around which it may be worn.

It is fully explained in this specification and illustrated in the accompanying drawings.

Figure 1:
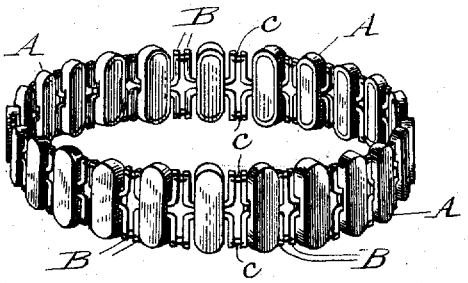
Figure 2:
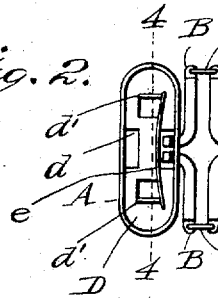
Figure 3:
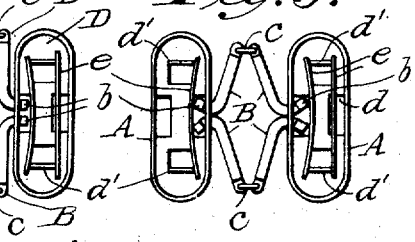
Figure 5:
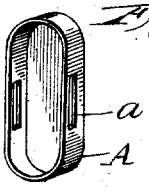
Figure 4:
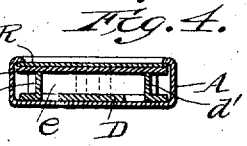
Figure 6:
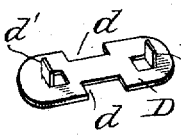
Figure 7:
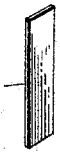
Figure 8:
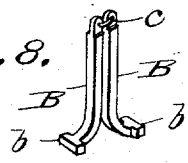
Figure 9:
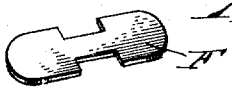
Figure 10:
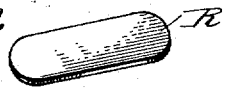

Figure 1 represents a perspective view of the bracelet. Fig. 2 is an enlarged view showing two links from the inner side of the bracelet with their backs removed, showing the mechanism on the inside of the cups and the links in the contracted or closed position. Fig. 3 shows the same view of the cups with the links in an extended position. Fig. 4 is a sectional elevation on line 4 4 of Fig. 2 with the back secured in place. Fig. 5 is a perspective view of one of the cups with the back removed. Fig. 6 is a perspective view of one of the notched plates which limits the stroke of the link-bars, also showing the lugs raised on either end for supporting the ends of the springs. Fig. 7 is a perspective view of one of the springs. Fig. 8 shows a perspective view of a pair of the link-bars held together at their upper end by a ring. Fig. 9 shows a perspective view of the upper notched plate, which also assists to limit the movement of the links. Fig. 10 is a perspective view of the back plate or cover for the cup.

In the construction the bracelet is made up of a series of elongated cup-shaped members A A, which may be drawn up out of sheet stock, with their sides slotted at *a a*. (See Fig. 5.) These cups A A are joined together by link-bars B B, each pair of which is hinged together at their outer ends by the ring *c*, which ring engages the hole pierced through their ends to receive it. The opposite end of each like bar B is bent around at nearly right angles to the body of the bar and a T-shaped head *b* formed upon it.

D is a plate (see Fig. 6) the sides of which are cut away or notched out at its center portion *d* to receive the T-head of the link-bars B B. The length of these notches into which the ends of the bar extend limit the motion of said bars, forming a stop, as illustrated in Fig. 3. The lugs *d′ d′* are raised out of the stock at either end of this plate and form supports for the ends of the flat sheet-metal springs *e e*, which rest against them on either side and extend across from one to the other of said lugs.

F is a plate (see Fig. 9) which rests on the ends of lugs *d′ d′* (see Fig. 4) and is also notched out on each edge at its center portion *f′*, corresponding to plate D, and is for the purpose of receiving the ends of and assisting in limiting the motion of the link-bars B B, as above explained.

In the assembling and operation of the parts the elongated cup-shaped member A may be drawn up into any desired ornamental form, open at its back to receive and inclose the operating mechanism. The plate D is then placed into it with the lugs *d′ d′* projecting outward. On either side of these lugs and extending from one to the other are the flat springs *e e*. The T-shaped ends of the link-bar B are inserted through the slots *a a* on either side of the cup, said ends resting against these flat springs *e e*, the tension of which tends to keep the bars in an upright position in line with the sides of the cup, as illustrated in Fig. 2. The notched plate F is next placed over the springs *e e* and is supported on the ends of the lugs *d′ d′*. The back plate R is then placed in position, and the edge of the cup is turned or rolled over it, holding the whole firmly in place without the use of solder. In drawing the links apart in opening up the bracelet to slide over the hand the curved backs of the bars B B roll together, as illustrated in Fig. 3, until the T-shaped heads bring up on the ends of the slots in the plates D and F, which limits their motion. On account of the great difference in leverage on the spring the bracelet may be extended to its limit with the greatest ease, and as the spring acts on the short arm of the lever the tension is extremely delicate and may be worn next to the flesh for an indefinite period without affecting the circulation or causing any unpleasant sensation. By this construction of springs and link-bars the bracelet is made very flexible, indeed so much so that it may be turned inside out, if desired. It is very neat and attractive in design and may be highly ornamented. In addition to its use as a bracelet it may be also worn as a belt, a collar, or a garter.

Having thus fully described my invention, what I claim as new, and desire to secure by Letters Patent, is—

1. In a device of the character described, the combination of a plurality of cup-shaped members, a plurality of angular link-bars interposed between said cup-shaped members, each of said cup-shaped members inclosing and retaining one end of a plurality of said link-bars, and springs for normally holding said link-bars in contracted position, the outer end of each link-bar being loosely connected to the corresponding link of the adjacent cup, as set forth.

2. In a device of the character described in combination a plurality of link-bars, a plurality of cup members, each link-bar being normally held in a line parallel with the sides of the adjacent cup member, one end of each of said bars being held to turn within the cup, said bar having its outer end loosely connected to the corresponding link of the adjacent cup, springs bearing against the inclosed ends of said links and adapted to hold them in a contracted or normal position, substantially as described.

3. In a device of the character described in combination a plurality of cup members, a plurality of link-bars extending out of and turned at right angles to and extending along parallel with each side of each cup member, the outer end of each link-bar loosely joined to the corresponding link in the adjacent cup, and a spring pressing against one end of a plurality of links, whereby the latter will be free to turn within the cup, substantially as described.

4. In a device of the character described, a plurality of cup members, a pair of link-bars extending out of each side of each of said cup members, the bars of each pair turned in opposite directions and at right angles to the portion which enters the cup, said bars extending in a line parallel to the sides of said cup members, and springs bearing against the inclosed ends of said bars whereby the latter are held free to turn, the outer ends of each link-bar being loosely joined to the corresponding link in the adjacent cup, substantially as described.

5. In a device of the character described in combination a plurality of cup members, a plurality of link-hars extending out of and turned at right angles to and extending along parallel with each side of each cup member, the outer end of each link-bar loosely joined to the corresponding link in the adjacent cup, and a spring bearing against one end of the link within the cup whereby the same is free to turn, means within each cup member for limiting the movement of the link-bars, substantially as described.

6. In a device of the character described, a plurality of cup members, a pair of link-bars extending out of each side of each cup member, the bars of each pair turned at right angles to the portion which enters the sides of the cup, said bars extending in opposite directions and parallel to the sides of said cup members, springs bearing against the inclosed ends of said links whereby the latter are held to turn or move, the outer end of each link-bar being loosely joined to the corresponding link in the adjacent cup, means within each cup member for limiting the movement of each link-bar, substantially as described.

7. In a device of the character described, in combination a plurality of link-bars, a plurality of cup-shaped members each member inclosing and retaining one end of a plurality of said link-bars, flat springs pressing against the inclosed ends of said bars to hold them in the contracted position, means within each cup member for limiting the movement of each link-bar, the outer end of said bars loosely joined to corresponding links in the next cup, substantially as described.

8. In a bracelet the combination of a plurality of link-bars, a plurality of cup-shaped members receiving the ends of said link-bars, springs acting upon the ends of a plurality of said link-bars and serving to retain them in position, a notched plate engaging the inclosed ends of said bars to limit their motion, the outer ends of said bars being loosely connected to the corresponding bar extending from the next cup member, substantially as described.

9. In a device of the character described, the combination of a plurality of link-bars, a plurality of cup-shaped members, each member inclosing and retaining one end of a plurality of said link-bars, flat springs pressing against the inclosed ends of said bars to hold them in the contracted position, a plate notched out to receive the inclosed ends of said bars to limit their motion, the outer ends of said bars being loosely joined to corresponding links in the next cup, substantially as described.

10. In a device of the character described, the combination of a plurality of cup-shaped members, a plurality of link-bars projecting therefrom, and connected together, and springs within the cup-shaped members operating said bars and arranged so that the tension thereof will tend to keep the bars in line with the sides of the cup-shaped members.

11. In a device of the character described, the combination of a plurality of cup-shaped members, a plurality of angular link-bars projecting therefrom, and pivotally connected together at their ends outside the cup-shaped members, and springs within the cup-shaped members for contracting the device.

12. In a device of the character described, the combination of a plurality of cup-shaped members, a plurality of angular link-bars projecting therefrom, rings connecting the angular link-bars, and springs within the cup-shaped members operating said bars and arranged so that the tension thereof will tend to keep the bars in line with the sides of the cup-shaped members.

13. In a device of the character described, the combination of a plurality of cup-shaped members, link-bars projecting therefrom and then turning substantially parallel with the sides of the cup-shaped members, and springs within the cup-shaped members for contracting the device.

14. In a device of the character described, the combination of a plurality of cup-shaped members, angular link-bars pivoted therein, and springs for turning the angular link-bars so as normally to contract the device.

In testimony whereof I have hereunto set my hand this 28th day of October, A. D. 1904.

FREDERICK MASON.

In presence of—
RALPH C. ESTES,
JOHN E. COONEY, Jr.